United States Patent
Kerpchar

[15] 3,689,156
[45] Sept. 5, 1972

[54] RANGE GATED IMAGE SYSTEMS USING PULSED ILLUMINATORS

[72] Inventor: Michael Kerpchar, Livingston, N.J.

[73] Assignee: Ocean Metrics, Inc., Fairfield, N.J.

[22] Filed: Nov. 12, 1969

[21] Appl. No.: 875,862

[52] U.S. Cl. ..................356/5, 250/199, 351/49, 2/14 J
[51] Int. Cl. ..........................G01c 3/08, G02c 7/12
[58] Field of Search ......356/4, 5, 114; 250/199, 225; 351/49; 313/111, 112; 2/14 N

[56] References Cited

UNITED STATES PATENTS

| | | | |
|---|---|---|---|
| 3,380,358 | 4/1968 | Neumann | 356/5 |
| 3,415,995 | 12/1968 | Kerr | 250/199 |
| 3,259,777 | 7/1966 | Fridrich | 313/225 |
| 3,446,555 | 5/1969 | Kahn | 356/5 |
| 2,409,030 | 10/1946 | Fraenckel | 356/5 |
| 3,245,315 | 4/1966 | Marks et al. | 351/49 |

Primary Examiner—Benjamin A. Borchelt
Assistant Examiner—S. C. Buczinski
Attorney—S. A. Giarratana

[57] ABSTRACT

A range gated imaging system uses a pulsed illuminator to light a target and to receive reflected light from the target without disturbances caused by backscatter from undesired sources.

The illuminator comprises a non-coherent light source which is polarized prior to application of the light beam to an electro-optic cell. A timing generator provides a pulse train, each pulse of which has a selectable duration, selected in accordance with the distance of the illuminator from the target. The pulse train is applied to the cell to provide an output of light pulses. A light sensitive device, such as a photo diode, detects the transmitted light pulses and provides an output pulse coincident with the trailing edge of the light pulse. This pulse is applied through a selectable variable delay circuit to activate another electro-optic cell in a receiver. Upon activation the receiver cell is caused to pass light to utilization means, when the transmitted light pulse as reflected from the desired target arrives at the receiver.

8 Claims, 9 Drawing Figures

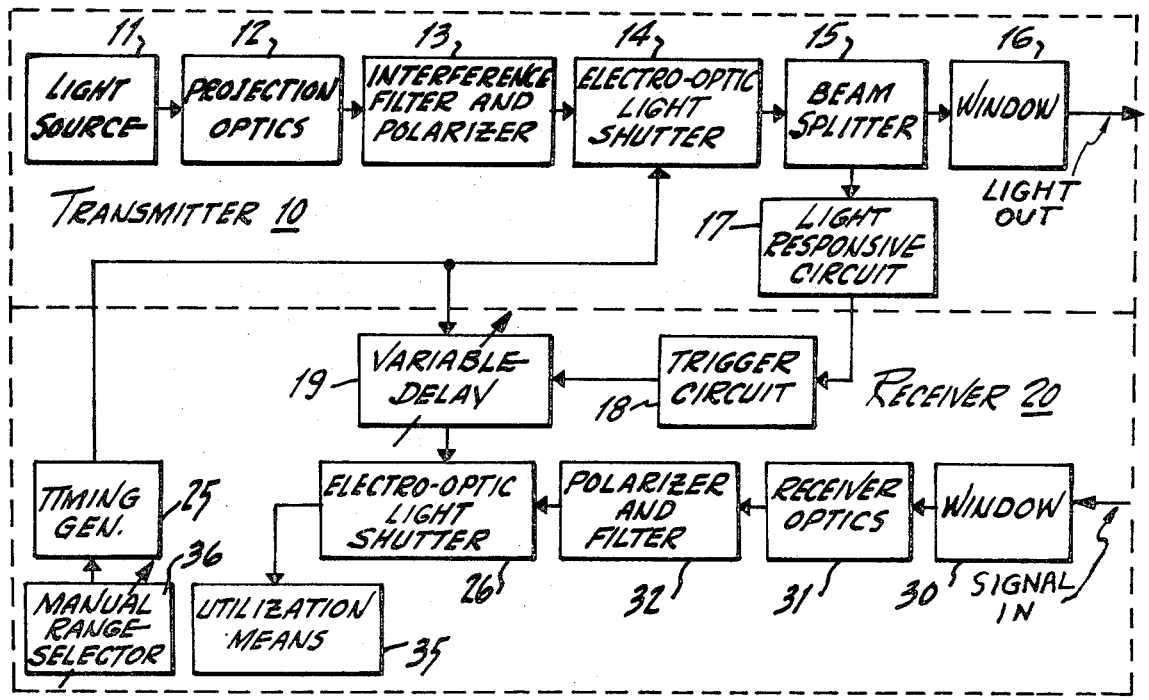
Fig. 1.
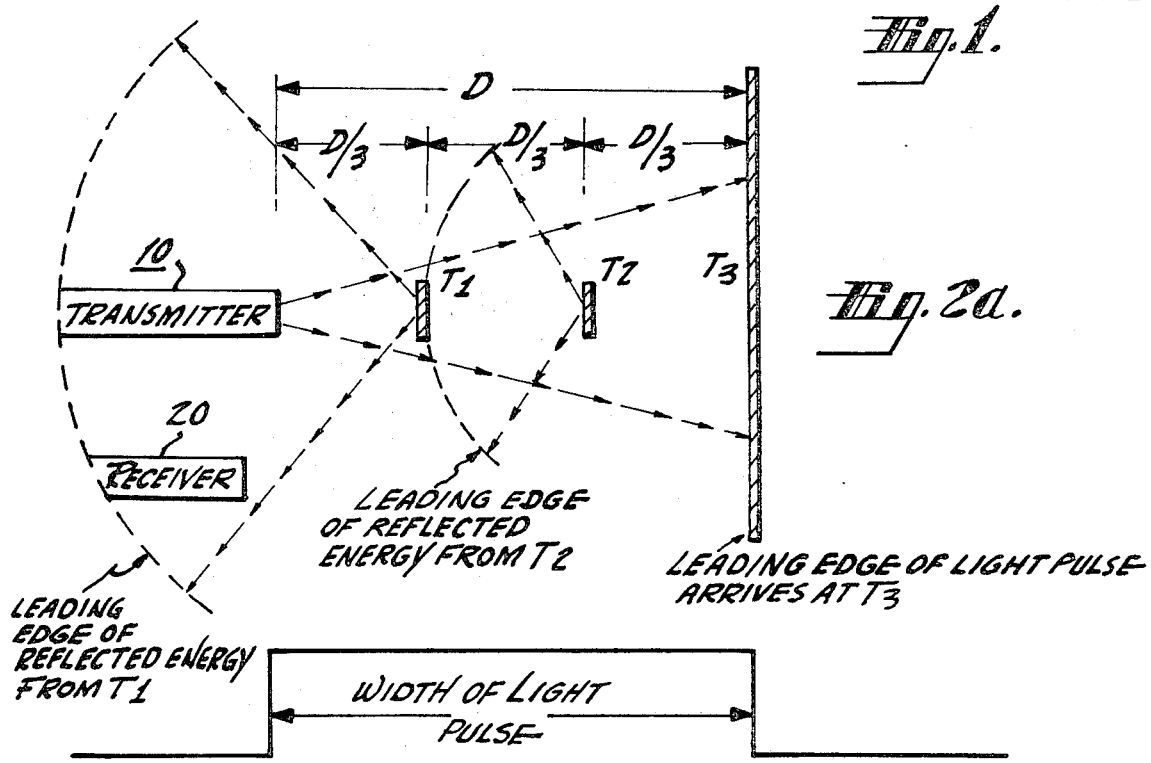
Fig. 2a.
Fig. 2b.

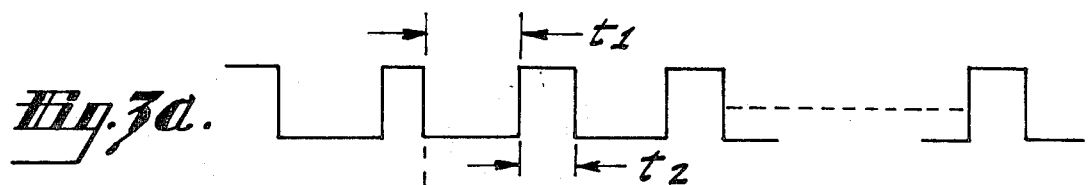
TRANSMITTER ELECTRO OPTIC LIGHT SHUTTER 14 PULSE
PULSE FROM LIGHT RESPONSIVE CIRCUIT 17
RANGE DELAY GATE
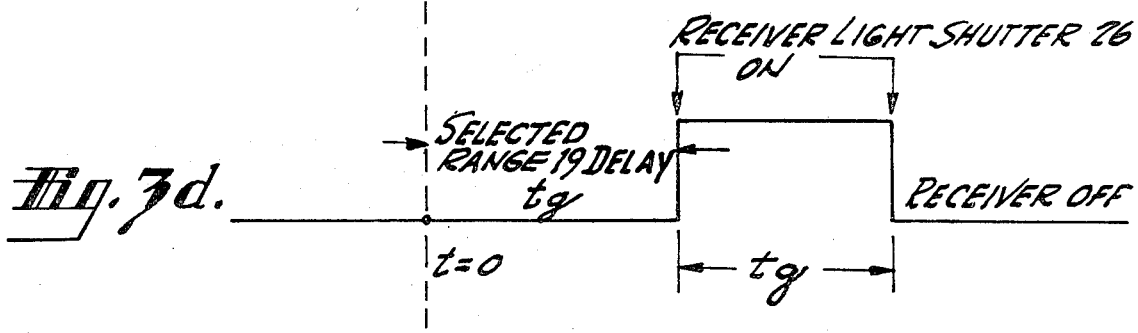
INVENTOR
MICHAEL KERPCHAR
BY [signature]
ATTORNEY

RANGE GATED IMAGE SYSTEMS USING PULSED ILLUMINATORS

This invention relates to modulated light illuminators and more particularly to such illuminators for use in range-gated imaging systems for obtaining more reliable and improved operation.

As is well known, certain scenes in various media such as water or air, are difficult to view accurately because of light reflections from various sources not associated with the scene.

Such disturbances may be caused by aerosols suspended in air or hydrosols suspended in water.

Particularly, underwater viewing is also limited to relatively short distances because of the high attenuation losses of light traveling through water. Such losses can be classified as absorption and scattering losses. Absorption is an irreversible thermodynamic loss and is a function of the wavelength of the light and the nature of the solutes in the water.

Scattering is a function of size, chemical composition and physical properties of hydrosols suspended in the water and their population density in the light transmission path.

When artificial illumination is the only available light source for target illumination, the limit of vision is completely dependent upon the light backscattered and the swimmer or viewer is plagued with the presence of overpowering glare.

To solve the problem, various proposals in the prior art suggest utilizing filters of temporal or spatial nature. Such filters are placed in the field of vision and can interfere with such vision in case of failure or for different viewing distances not within the filter's capability. Other alternatives employ range gating techniques to eliminate the veiling brightness caused by backscatter thus enabling the viewer to see scenes farther away than he could view with artificial illumination.

Certain prior art approaches utilize a laser, as a source of illumination in conjunction with range gating approaches. The laser subsystem is unreliable in that the equipment is complicated, difficult to fabricate and is characterized by large failure rates. The cost of the laser utilized is high as are the cost of associated optics and assemblies.

It is therefore an object of the present invention to provide an improved illuminator for use in a range gated image system.

Another object is to provide an improved range gated image system using an economical and reliable illuminator assembly.

A further object is to provide an improved range gating system using a pulsed illuminator for enhancing underwater scene viewing.

Still a further object is to provide an improved range gated system for use with human vision without the use of artificial screens or filters.

Still another object is to provide an improved range gated image system which eliminates the need of a laser while providing safe and improved viewing capability.

These and other objects are accomplished in one embodiment of the present invention by utilizing a conventional light source, whose emission is polarized and modulated by means of an electro-optic cell under the control of a pulse waveform to provide an output of a series of light pulses used for transmission to an illumination of a target. The pulsed light energy is detected and the trailing edge of each pulse is utilized to energize intermittently an electro-optic cell in a receiver after the elapse of time intervals dependent in duration upon the distance of the target from the transmitter. More specifically, the receiver cell is repetitively enabled only after the intervals corresponding to the time required for the reflected light pulses from the desired target is to reach the receiver. The technique permits the glare caused by reflections in the near field of view to be virtually eliminated from the receiver's field of vision.

Alternate embodiments include a transmitter and receiver assembly adapted for use in underwater viewing by employing electro-optic cells as lenses for a swimmer's goggles. Such cells are again controlled by a pulse derived from the trailing edge of the transmitted pulse and delayed according to the distance of the target or scene to be viewed.

These and other objects of the present invention will become clear if reference is made to the following specification when read in conjunction with the accompanying figures in which:

FIG. 1 is a detailed block diagram of a range gated image system according to this invention;

FIG. 2a is a diagram showing the spatial relationships of a transmitter-receiver assembly according to the invention with associated viewing targets, useful for explaining the system operation;

FIG. 2b is a temporal diagram of a typical transmitted light pulse used in explaining FIG. 2a;

Figure 4:
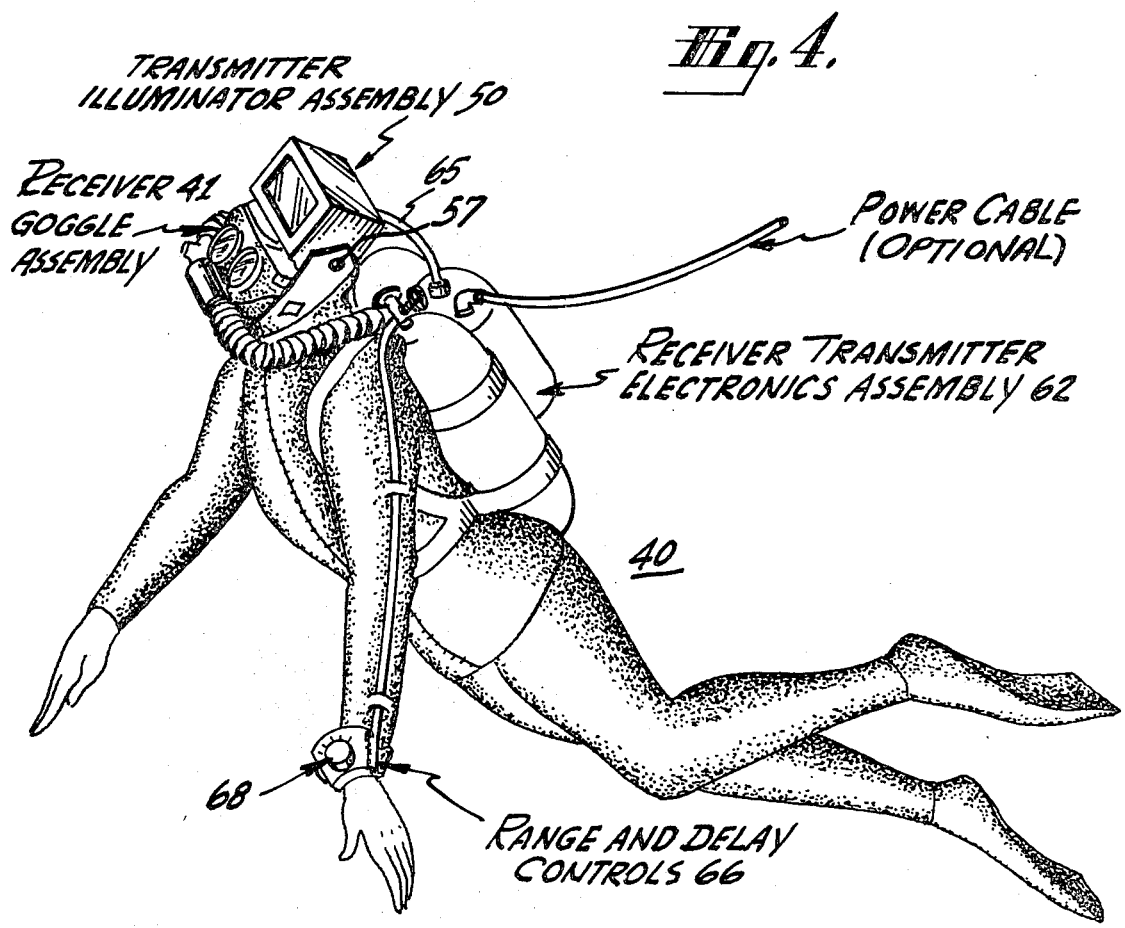
Figure 5:
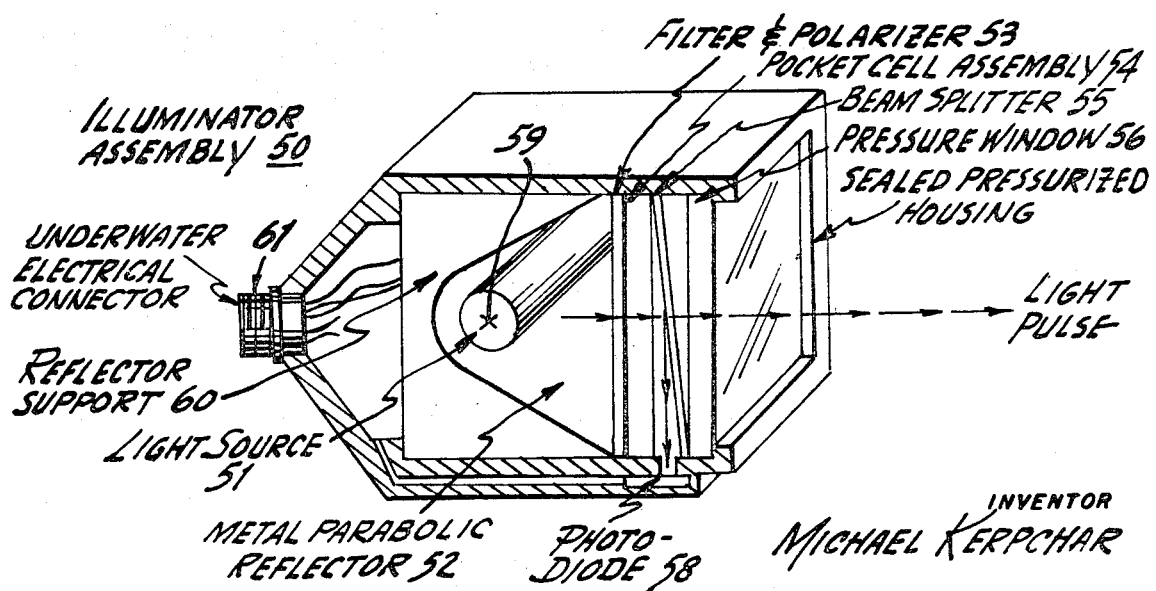

FIGS. 3a—3d are a series of timing waveshape diagrams used for explaining the operation of the system of FIG. 1;

FIG. 4 is a diagrammatic view of a diver utilizing apparatus according to this invention; and FIG. 5 is a view partially in cross section of an illuminator assembly according to this invention.

Referring to FIG. 1, there is shown a transmitter assembly 10, and a receiver assembly 20, each separately enclosed by a dashed rectangle and suitably designated.

The transmitter assembly 10 comprises a light source 11 which may be any suitable, conventional source of radiation, such as a mercury arc lamp or an infra red source.

The light emanating from the source 11 is propagated in turn through projection optics 12, an interference filter and polarizer 13 and thence to an input of an electro-optic light shutter or modulator 14. The output of the modulator 14 is directed to a beam splitter 15, where a major light beam is propagated through a suitable window or aperture 16 to be directed towards a target or viewing area.

The beam splitter 15 functions to split a portion of the light beam at the output of the shutter 14 and direct it to a light responsive circuit 17 for coupling to the receiver circuitry 20.

Shown included in the receiver assembly 20 is a timing generator 25 which has an output coupled to an input of the electro-optic light shutter 14 of the transmitter assembly.

The electro-optic light shutter 14 utilized in the transmitter may preferably be a Pockels cell device. Such devices utilize an electro-optic effect present in certain crystals of a well known class. When electric fields are applied to these crystal types, changes in the optical properties occur. The effect is a linear function of the voltage applied. In crystallographic terms, such crystals as KDP (potassium dihydrogen phosphate), KD*P (potassium dideuterium phosphate) and ADP (ammonium di-hydrogen phosphate), change upon the application of the electric field from uniaxial to biaxial states. These changes are utilized to produce intensity modulation of light beams, the largest electro-optic effect being obtained when the electric field vector and the direction of light propagation are both parallel to the conventional Z axis. When such a crystal is placed between crossed polarizers, the resulting combination performs as a high speed shutter with a closure time limited only by the rate at which the applied voltage is changed. Of the above noted crystal materials KD*P has advantages in that its electro-optic effect is approximately 2.5 times that of KDP. Thus for any required optical effect, 2.5 times less voltage is needed when KD*P is used.

The timing generator 25 serves to apply a voltage signal to the electro-optic light shutter 14, for controlling the closure time of the shutter according to the magnitude and rate of the applied pulses emanating from the timing source 25, as will be explained further. Essentially, the output from the shutter 14 is a series of light pulses having a duration and repetition rate contingent upon the waveshape applied to the shutter 14 from the timing generator 25.

In general, a well collimated light source 11 is needed to provide the best contrast or extinction ratio in on/off operation or large amplitude modulation. For example, it is known that optimum performance can be obtained from a Pockels cell modulator with a well collimated, monochromatic light source. With a source such as a He-Ne laser, it is not unusual to obtain extinction ratios (ratio of maximum to minimum light transmitted) in excess of 2,000:1.

When a white light source having appreciable divergence is utilized, the extinction ratio is dependent upon the extent of beam divergence and crystal thickness. Generally it is established that the use of a thinner crystal and a smaller beam divergence would result in improved extinction ratios. Therefore, the function of the projection optics 12 is to obtain a suitable divergence pattern from the light source 11 for providing an optimum input to the electro-optic light shutter 14.

In general, for distributed sources such as tungsten filaments or gaseous discharge tubes, which emit radiation in nearly hemispherical patterns, a small cone of light is gathered by a fast lens and focused on a small aperture. The outgoing light is then collimated by placing a second lens spaced a focal length in front of the small aperture. With this type of collimation, the divergence angle $\theta$ of the beam is approximately given by $$\arctan \theta = 2[d/f_2]$$

where
$d$ = diameter of aperture
$f_2$ = focal length of the second lens.

For point sources such as Zirconium arc lamps, and the like, the fast lens can be eliminated and the beam divergence is again given by the above equation with d being equal to the equivalent spot diameter of the arc.

Hence, there are many lens or projection optics configurations known in the prior art to reduce the divergence of the beam in order to obtain improved extinction ratio operation in electro-optic modulators.

The function of the polarizer and interference filter 13 is to operate on the diverged beam to suitably polarize it before modulation occurs.

Primarily, the above noted electro-optic modulators (as 14) serve to control the state of polarization of light propagation in the direction parallel to the optic axis of the crystals employed therein. When electric fields are applied parallel to the Z axis, the optic axes ($X'$ and $Y'$) no longer coincide with the crystallographic X and Y axes but are rotated approximately 45°. The angle is relatively independent of the magnitude of the electric field. If linearly polarized light is propogated through the crystal with the direction of polarization parallel to the X and Y axis, the components of this wave, parallel to the electrically induced axes, will suffer a relative phase shift. In general, orthogonal components undergoing a relative phase shift produce elliptically polarized waves.

Thus the application of voltage in certain configurations changes linearly polarized light to elliptically polarized light. If the light then passes through a polarizer, the resulting light intensity will be a function of the ellipticity and therefore the voltage applied to the crystal.

Hence, a polarizer may be used subsequent to the shutter 14 as shown in FIG. 1. However, when a polarizer is used prior to the shutter 14, and its polarization axis is parallel to the crystal X or Y axis it provides linearly polarized light from non-polarized light and produces a transmission null in the absence of applied voltage. The voltage required to provide a transmission maximum is called the half-wave voltage, which in essence, causes a relative phase shift of 180° in the orthogonal components. The resulting output from the crystal is polarized at right angles to the input waves.

The interference filter serves to filter the light going to the polarizer into a relatively narrow spectral region. Such filters are usually constructed by evaporating successive coatings of silver, a dielectric and silver on a glass substrate and are usually cemented to a glass plate for purposes of protection. The spectral energy of the light source is important for purposes of utilizing the system, to be described, in various different media such as water and air for obtaining optimum performance.

In summation, the divergence angle of light source 11 is adjusted by the projection optics 12, and limited in spectral energy by the filter and polarizer module 13 before application to the electro-optic shutter 14, which is controlled by a voltage waveshape form timing generator 25.

The output light light energy from the electro-optic light shutter 14 passes through beam splitter 15, which enables the light responsive circuit 17 to detect the transmitted radiation at the instant it leaves the transmitter. The beam splitter 15 may be a beam splitting prism, sometimes referred to as a Williams prism, a fiber optic arrangement or the like. The portion of the light pulse directed to light responsive circuit 17 may be detected by a photo diode or some other suitable device such as photo-transistors, phototubes, multiplier phototubes and the like.

The pulse developed by the photo diode or the light responsive circuit 17 is at the trailing edge of the transmitted pulse and establishes a time reference for the system. The pulse is shaped and activates a trigger circuit 18, which may be a monostable multivibrator to provide a suitably shaped pulse for application to a variable delay circuit 19. The variable delay circuit 19 serves to delay the reference pulse a predetermined, selectable amount before the pulse is utilized to activate an electro-optic light shutter 26 located in the receiver. Variably delay circuits 19, are well known in the art and may include a multivibrator, delay line or the like. The electro-optic light shutter 26 in the receiver is a similar device to that described for the transmitter and can also be a Pockels cell. The Pockels cell 26 in the receiver is synchronized so that it is turned on at the instant the reflected light energy previously transmitted is returned from a target. The duration of the ON time of the receiver's Pockels cell can be designated for optimum performance by making it equal to the propagation interval of light between the transmitter and target.

The output of the receiver's electro-optic shutter is coupled to a suitable utilization means 35 for displaying and viewing the reflected light. Such means may be the film of a camera, the eye of a viewer, or may also be coupled through suitable image enhancement equipment and so on and displayed on a video monitor synchronized by the timing generator 25.

Examples of suitable applications for the apparatus shown in FIG. 1 will be explained in detail subsequently after a description of the operation and advantages of the system.

Referring to FIGS. 2A, and 2b, there are shown diagrams explaining the spatial and temporal relationship of the system described in FIG. 1.

Assume that the three targets $T_1$, $T_2$ and $T_3$ are placed equal distances from each other and from the transmitter 10, receiver 20 assembly. Assume further that time is stopped the instant the trailing edge of the light pulse shown below, (FIG. 2b) has left the transmitter 10. At that instant, the leading edge of the light pulse has reached the target $T_3$.

The velocity of light $C$ is given by:

$$C = \lambda v$$

where
$C$ = velocity
$\lambda$ = wavelength of light
$v$ = frequency of light

The velocity of light differs in air and water and other mediums as well. In free space (vacuum) light travels at approximately 186,000 miles per second or about 0.186 miles (1,082) feet per micro second. Using this velocity by way of example, if target $T_3$ were approximately 1082 feet ($D = 1,082$ feet) away from the transmitter, the leading edge of a 1 microsecond pulse would arrive thereat in 1 microsecond. The leading edge of this pulse would already have been reflected back from $T_1$ and $T_2$ which are respectively only one-third and two-thirds the distance from the distance from the transmitter/receiver assembly. The leading edge of the wave fronts reflected $T_1$ and $T_2$ are shown in FIG. 2A and are appropriately labeled. The radiated energy will continue to be reflected from $T_1$ and $T_2$ until the trailing edge of the transmitted pulse has propagated past these targets. At the instant the trailing edge has arrived at $T_1$, there is no glare in the viewing path caused by backscatter from either aerosols or hydrosols, depending upon whether the system is operated in air or water.

If $T_1$ were the target of interest the variable delay would be set for D/3 and the receiver's Pockels cell (26 of FIG. 1) would be turned on at the instant the trailing edge of the transmitted light pulse arrived at $T_1$. For that case, the viewing path is filled with a column of reflected light with no veiling brightness, other than that generated by forward scattering.

A manual range selector 36 can be utilized and coupled to the timing generator 25 of FIG. 1 for controlling the ON - OFF interval of the timing pulse such that the transmitted pulse or the ON interval would be equivalent to the transit time required for the transmitted energy to reach the desired target.

Referring to FIG. 3, there is shown some timing waveshapes incorporated in the above described system.

FIG. 3a shows the output pulse from the electro-optic light shutter 14 of FIG. 1. The distance between the trailing edge of one pulse and the leading edge of the next succeeding pulse is designated as $t_2$, and the pulse duration is $t_1$.

In FIG. 3b, there is shown the pulse from the photo diode or light responsive circuit 17 occurring at the trailing edge of the transmitted pulse. The differentiated pulse from the light responsive circuit triggers the trigger circuit 18 which may, for example, provide a ramp voltage as shown. A d.c. voltage generated with the variable delay circuit is added to the trigger range delay gate of FIG. 3c to determine when the receiver's Pockel cell is to be activated. The receiver's Pockels cell is shut off automatically after it has been on for the selected range delay $t_g$ as shown in FIG. 3d.

In the manner shown in FIGS. 2 and 3, the receiver is turned on when the trailing edge of the light pulse reaches the desired target. At that instant, the viewing path is filled with a column of reflected light or reflected signal photos with no veiling brightness other than that generated by forward scattering. The backscatter generated by traveling light would now become background illumination and would generate a halo about the scene, but because of the increased distance which this scattered light must travel, it will be attenuated and have minimum influence on the retrieved information.

More distant targets enjoy a longer duty cycle, where it is needed, because of the attenuation losses experienced by distance. In fact, for a target 1,086 feet away in free space, the receiver would be turned on at the instant the trailing edge of the light pulse arrived at the target, which would for a one microsecond pulse coincide with the instant the leading edge of the reflected energy arrived at the receiver. Thus the receiver would be turned off for two microseconds after the trailing edge left the transmitter and would be turned on for one microsecond so that it could accumulate the maximum signal photons.

To improve the duty cycle, a variable ON - OFF interval, implemented by the manual range selector 36 can be incorporated. Such an arrangement would utilize an effective duty cycle of 33 percent of the illumination energy.

Referring to FIG. 4, there is shown a swimmer or diver 40 equipped with a breathing apparatus and having a goggle assembly 41, containing an electro-optic modulator or Pockels cell as pulsed and utilized in the receiver configuration ( 26 of FIG. 1).

The transmitter illuminator assembly 50 as shown in greater detail in FIG. 5 is mounted in a pressurized housing adapted to be fastened by means of a belt arrangement 57 on the head gear of the diver 40.

The system described above will permit swimmers to perform many missions in turbid waters which have heretofore been impractical because of the limited vision caused by the high glare of artificial illumination. The gating arrangements which are range dependent as described eliminate the veiling brightness caused by backscatter enabling the user to see at far distances.

The illuminator assembly 50 of FIG. 5 comprises a light source 51 which may be a thallium-iodide-mercury lamp, with an optical assembly made up of a parabolic reflector 52, an interference filter and polarizer 53, a Pockels cell shutter 54, a beam splitter 55 and a pressure window 56. The illuminator assembly also contains a photo diode 58 used for detecting the trailing edge of the transmitted light pulse.

The addition of thallium iodide to mercury results in visible radiation which is concentrated mainly in the wavelength region of 5,300 –5,400 Angstrom units. This range is well within the transmission window of distilled water (4,000–6,000 Angstrom units) and because of the narrow bandwidth of the thallium-iodide-mercury lamp a significant improvement in the extinction ratio for the Pockels cell is obtained.

The parabolic reflector 52 runs along the length of the lamp and the mercury arc element 59 lies on an axis which is at the focal point of the parabola. In this manner, the light source 51 as mounted appears on the locus of points of the parabolic reflector 52 much the same way as a flash lamp is mounted in an elliptical cavity laser. The reflector 52 is formed by resting a polished metal sheet on parabolic shaped support 60 spaced along the length of the lamp and closed by parabolic end plates. The heat generated by the lamp is readily dissipated by immersion in water. The heat sink capabilities of the ocean, or other body of water for all purposes will prevent any significant heat rise. The photo diode 58 is capable of operating at 71°centigrade without degradation. It is maintained within its operating temperature range by its placement near the outer core of the illuminator coupled with the fact that it is not in close proximity to the lamp.

The interference filter which may be a piece of lead glass will filter out the infra red constituents of the lamp and eliminate any possible thermal impact on the electro-optic light shutter or Pockels assembly 54. The illuminator is coupled to a rear mounted cable and connector assembly 61, and as seen from FIG. 4 is coupled to the electronics assembly 62 via cable 65.

In FIG. 4, the illuminator 50 is coupled to a base which fits on the diver's head so that it does not have to be manually touched. The base is fitted with a pivot so that the illuminator 50 may be adjusted relative to the diver's head to control beam positioning.

As previously mentioned, the goggle assembly 41 contains Pockels cells as the lens elements. The cells are molded integrally in a rubber mask together with the associated connecting wires. The high source impedance voltage from the timing generator (25 of FIG. 1) required by the Pockels cell presents no problems to the diver's safety. The Pockels cell may be sandwiched between two non-conducting glass plates, and the integral molding of the lens assembly into the rubber mask precludes any inadvertent contact with the circuits. The absence of a pulse from the timing generator or the loss of signal leaves the lens clear. Pockels cell extinction, as described, in the receiver requires the presence of a signal.

The goggle assembly uses cable 65 to couple the Pockels cells to the receiver electronics 62.

Contained in the electronics assembly 62 are the timing generator, a variable delay circuit, trigger circuit, plus wiring and so on. The entire contents are mounted in a high strength cylindrical stainless steel case with a gasket seal. The assembly is back-mounted and preferably nested between the diver's oxygen tanks.

The range and delay control unit 66 is wrist mounted and contains an ON - OFF power control and a variable potentiometer used as a manual range selector to enable the diver to select the desired target. A calibrator dial 68 is provided for setting the range. The swimmer does not have to "read" or use the range control as the sole indication of proper system functioning is the improved visibility he will obtain by the range gated techniques described herein when the range control is at the correct setting.

The system configuration and utility as applicable to divers' head gear permits the swimmer to "electronically" close his eyes while the transmitted pulse is traveling to the scene, thus enabling him to "blind out" the backscatter from his vision.

At the instant the reflected light reaches the swimmer, his goggles are activated enabling him to clearly see the scene without the disturbances of backscatter. Another feature is that the dark adapted eye is more sensitive than when the scene has ambient illumination. The high glare contributed by the backscatter prevents the eye from operating sensitively thus undesirably limiting the swimmer's vision.

I claim:

1. A range gated imaging system for optical viewing of a scene remotely located from a given point comprising,
    a. a continuously operative source of light located at said given point,
    b. means associated with and interposed between said light source and said scene for providing at an output thereof, a polarized light beam for controlled divergence angle,
    c. a Pockels cell light shutter optically coupled between said scene and said means and having an input terminal for application thereto of a control signal for regulating the intensity of said polarized beam propagating through said shutter,
    d. a source of electrical signal pulses coupled to said input terminal of said light shutter to cause said shutter to provide a train of light pulses at an output thereof for illuminating said scene,
    e. light detecting means responsive to said light pulses for providing a second electrical signal at an output terminal thereof indicative of the trailing edge of each of said light pulses, f. a second Pockels cell light shutter having an input terminal for application thereto of a control signal for regulating the intensity of a light beam propagating through said shutter and including a crystal having a voltage-controllable index of refraction mounted in a lens assembly adapted to be interposed in the line of vision of a viewer of said scene, g. variable delay means coupled between said light detecting means and said input terminal of said second light shutter for applying said second electrical signal to said input terminal to cause said shutter to pass reflected light pulses from said scene after a selectable delay period, and h. means operable by the viewer of said scene for adjusting said source of pulses and said delay means to achieve a pulse duration and delay period correlated to the distance of said light source form said scene.

2. The system according to claim 1 wherein said source of light is a thallium-iodide-mercury arc lamp.

3. Apparatus for enhancing the viewing of scenes whereby reflected light from particles suspended in a light transmission media between the scene and the point of vision undesirably tend to veil the image of the scene, comprising, a. a source of light located at said point of vision, b. means coupled between said source of light and said scene to be viewed, for providing a polarized light beam from said source, c. a first electro-optic light shutter positioned in the illumination path between said source of light and said scene and having a control electrode for application thereto of a predetermined potential for enabling said light beam to propagate through said shutter towards said scene when said predetermined potential is applied and to block light when said potential is not applied, d. a source of pulses, each pulse having a given duration defined by a potential level substantially equal to said predetermined potential, said source coupled to said control electrode of said first electro-optic light shutter for enabling said shutter to transmit light pulses towards said target during said given duration, e. detecting means coupled to said shutter and responsive to said transmitted light pulses of said given duration for providing a control signal at the end of said duration coincident with the trailing edge of said pulse, said control signal having another duration selected in accordance with the distance between said scene and said source of light, f. receiving means, including a second electro-optic light shutter having a control electrode coupled to said detecting means, said second electro-optic light shutter enabled to pass light during said control signal duration which because of said duration corresponds to the first reflections from said source of said transmitted light pulses whereby any reflections due to said pulses from said particles between said scene and said point of vision have propagated past said receiving means, said second electro-optic light shutter being a Pockels cell modulator fabricated from a crystal having a voltage-controllable index of refraction and adapted to be mounted between a lens assembly adapted to be disposed in the line of the vision of a viewer of said scenes.

4. The apparatus according to claim 3 for use in a liquid media such as water, wherein said
a. source of light is selected to radiate in the spectrum between 4,000 and 6,000 Angstrom units,
b. a waterproof housing having an internal hollow,
c. means for mounting said reflector and said source of light within said hollow of said housing.

5. The apparatus according to claim 3 to further comprising,
a. control means coupled to said source of pulses for selectively varying said given duration to accomodate a plurality of scenes between said point of vision and said source of light.

6. The apparatus according to claim 3 further comprising,
a. variable delay means coupled to said detecting means for controlling said other duration according to the distance of a desired one of a plurality of scenes remote from said point of vision.

7. A range gated optical viewing system comprising:
a source of continuous duty, high intensity, non-coherent light;
an optical assembly associated with said light source and generating therefrom a polarized light beam having a controlled divergence angle;
a pair of light shutters each including an electro-optic crystal having a voltage-controllable index of refraction;
means mounting one of said shutters to intercept a beam of light propagating through said optical assembly and the other of said shutters to intercept a reflection of said light beam from an object being illuminated thereby;
a source of electrical signal pulses coupled to said one shutter to enable passage of a train of light pulses from said source;
light detecting means responsive to said light pulses to generate an electrical signal indicative of the trailing edge of each of said light pulses;
variable delay means coupled between light detecting means and said other light shutter for enabling said shutter in response to said electrical signal to pass reflected light pulses intercepted thereby after a selectable delay period; and
means for adjusting said source of signal pulses and said delay means to achieve a light pulse duration and delay period correlated to the distance of said light source to an object illuminated by light pulses therefrom.

8. A system according to claim 7 wherein said light shutters comprise Pockels cells.

* * * * *